United States Patent [19]

Edens et al.

[11] 4,260,435
[45] Apr. 7, 1981

[54] COPPER-NICKEL-SILICON-CHROMIUM ALLOY HAVING IMPROVED ELECTRICAL CONDUCTIVITY

[75] Inventors: Walter W. Edens, Hartland; Quentin F. Ingerson, Wauwatosa, both of Wis.

[73] Assignee: Ampco-Pittsburgh Corporation, Milwaukee, Wis.

[21] Appl. No.: 54,293

[22] Filed: Jul. 2, 1979

Related U.S. Application Data

[62] Division of Ser. No. 11,110, Feb. 12, 1979, Pat. No. 4,191,601.

[51] Int. Cl.$^3$ .......................... C21D 1/00; C22F 1/08
[52] U.S. Cl. .................................... 148/32.5; 75/159; 75/160
[58] Field of Search ........................ 75/153, 159, 160; 148/11.5 C, 12.7 C, 160, 32.5

[56] References Cited

U.S. PATENT DOCUMENTS

| | | | |
|---|---|---|---|
| 1,658,186 | 2/1928 | Corson | 75/160 |
| 1,763,303 | 6/1930 | Graham | 148/12.7 C |
| 1,778,668 | 10/1930 | Fuller | 75/160 |
| 3,072,508 | 1/1963 | Klement et al. | 75/160 |

Primary Examiner—L. Dewayne Rutledge
Assistant Examiner—Peter K. Skiff
Attorney, Agent, or Firm—Andrus, Sceales, Starke & Sawall

[57] ABSTRACT

A copper-nickel-silicon-chromium alloy having a high hardness and improved electrical conductivity. The alloy is composed by weight of 2.0% to 3.0% nickel, 0.4% to 0.8% silicon, 0.1% to 0.5% chromium, and the balance copper. The silicon is used in excess of the stoichiometric relationship with nickel to provide excess silicon, and the chromium is used in excess of the stoichiometric relationship with the excess silicon. The alloy is heat treated by initially heating the alloy to a temperature in the range of 1600° F. to 1800° F. and is thereafter quenched. The quenched alloy is then subjected to a two-step aging treatment in which the alloy is initially aged at a temperature of 900° F. to 1100° F. to precipitate the metal silicides and develop a hardness in excess of 90 Rockwell B (185 Brinell) and subsequently is subjected to a second aging at a temperature in the range of 750° F. to 900° F., which serves to precipitate the excess chromium from solution and increase the electrical conductivity to a value greater than 45%.

2 Claims, No Drawings

COPPER-NICKEL-SILICON-CHROMIUM ALLOY HAVING IMPROVED ELECTRICAL CONDUCTIVITY

This is a division of application Ser. No. 011,110, filed Feb. 12, 1979, now U.S. Pat. No. 4,191,601.

BACKGROUND OF THE INVENTION

In industry and commerce there is need for metals of good hardness with good conductivity. These two properties are quite incongruous since good conductivity is a property of pure metals whereas good hardness is normally achieved by alloying the pure metal with one or more metals.

Copper and silver are the two metals that exhibit the highest electrical and thermal conductivity. Silver has excellent conductivity, but is soft and very expensive. Copper, although relatively expensive, is widely used where high conductivity is necessary and is, in fact, the standard used in rating the conductivity of other metals. However, copper is comparatively soft in its pure state, and to strengthen copper and increase its hardness, it must either be cold worked or alloying elements must be added. Cold working does not reduce the conductivity, but if the application is such that the copper is subsequently heated, the properties obtained by cold working can be lost. Adding alloying elements to copper reduces the conductivity to significantly low levels, depending upon the specific element and quantity used.

Brasses and bronzes, of which there are many kinds, are copper base alloys to which, singly or in combination, such elements as tin, zinc, aluminum, iron, etc., have been added for strength. Such additions seriously reduce the electrical and thermal conductivity. For example, when added singly to pure copper, as little as 0.1% of nickel, aluminum or tin will reduce the 100% electrical conductivity of pure copper to 94%, 91% and 99%, respectively, and a 1% addition of these elements will drop the conductivity to less than 50%. As little as 0.1% silicon or phosphorous will reduce the electrical conductivity of copper at least 50%, with little or no significant improvement in strength or hardness.

Certain elements have a varying degree of solid solubility in copper, which changes with temperature. This makes possible the well known age or precipitation hardened alloys, Corson U.S. Pat. No. 1,658,186 was an early pioneer in the discovery of the age or precipitation hardening phenomenon in copper base alloys. The basic concept was one in which he found that certain elements could be put into solid solution in selected copper alloys by heating the metal to an elevated temperature, followed by rapid cooling in a quenching media. Then, by reheating to a selected lower temperature for various periods of time, he found that specific metallic compounds could be precipitated out of the solid solution. The effect of this treatment served two purposes. First, the alloying elements precipitated out of solid solution are in the form of discrete particles, which increased the strength and hardness by interfering with the normal mode of physical deformation of the metal under stress. Secondly, it increased the electrical conductivity of the alloy through the effective removal of alloying elements which were precipitated from the copper matrix.

More particularly, the patent to Corson U.S. Pat. No. 1,658,186 describes copper alloys containing silicon, and one or more of a group of silicide forming elements, specifically chromium, cobalt and nickel. In accordance with the Corson invention, improved hardness is achieved by a heat treatment consisting of heating the alloys to a temperature in the range of 705° C. to 975° C. (1382° F. to 1787° F.) and subsequently quenching the alloy to hold the bulk of the alloying elements in solid solution. After quenching, the Corson alloys are aged at a temperature in the range of 250° C. to 600° C. (482° F. to 1112° F.) to precipitate the metallic silicides resulting in an increase in hardness with improvement in electrical conductivity.

As described in the Corson patent, several classes of alloys were produced, including (1) an alloy having an electrical conductivity of 35% and a hardness of 150 Brinell; (2) an alloy of 55% conductivity with a minimum hardness of 135 Brinell; and (3) an alloy with 75% conductivity with a minimum hardness of 110 Brinell. The Corson alloys have never achieved significant commercial importance where both high hardness and high conductivity are required, as in the case of resistance welding electrodes.

In resistance welding of metals, the spot welding tips or contact materials must have good hardness and strength to hold their shape and they must be able to conduct sufficient electrical current to make the weld without undue heating of the contact material, which would cause softening and deformation.

The one common alloy used for resistance welding of stainless steel, is identified by the Resistance Welding Manufacturing Association as the Class 3 type. The specification for this alloy calls for a minimum electrical conductivity of 45% of the conductivity of pure copper, with a minimum hardness of 90 Rockwell B (185 Brinell). The alloy that has been commonly used contains beryllium, the vapors of which have been identified as being toxic. The copper-beryllium alloy must be melted only under the strictest vapor control, and fine grinding dust must be completely collected in the work area. These restrictions have reduced the number of suppliers, and greatly increased the production cost.

SUMMARY OF THE INVENTION

The invention is directed to a copper-nickel-silicon-chromium alloy having a high degree of hardness, along with improved electrical conductivity, above 45%.

The alloy is composed of a total weight of 2.0% to 3% nickel and/or cobalt, 0.4% to 0.8% silicon, 0.1% to 0.5% chromium, and the balance copper. In the alloy of the invention, cobalt can be substituted in whole or in part for the nickel, although the total elimination of nickel can cause some depreciation in mechanical properties.

To provide the desired high hardness and strength along with high electrical conductivity, it is necessary to employ specific weight ratios between the nickel and/or cobalt, the silicon and chromium. The silicon is used in an amount slightly in excess of the stoichiometric amount necessary to form silicides of the nickel and/or cobalt, thereby removing the nickel and/or cobalt from solution as $Ni_2Si$ and leaving excess silicon.

The chromium is used in an amount slightly greater than the stoichiometric amount required to form chromium silicide, $Cr_3Si$ or $Cr_5Si_2$, with the excess silicon. Because of the low solubility of chromium in copper, the excess chromium will be precipitated by a second aging treatment.

The desired hardness is achieved by a precipitation hardening treatment in which the alloy is initially heated to a solution temperature in the range of 1600° F. to 1800° F. and quenched to room temperature in water or other suitable media. The alloy is then reheated to a temperature in the range of 900° F. to 1100° F. to allow the precipitation of silicides and develop a hardness in excess of 90 Rockwell B (185 Brinell) and an electrical conductivity in the range of 35% to 40%.

The alloy is then subjected to a second aging treatment by heating to a temperature in the range of 750° F. to 900° F., and at this temperature the excess chromium, over and above that necessary to form chromium silicide, is precipitated to thereby improve the electrical conductivity of the alloy to values greater than 45%.

As an alternate procedure, the alloy can be subjected to controlled furnace cooling from the first aging temperature down to the second aging temperature and holding the alloy at the second aging temperature for a period of time sufficient to develop the required electrical conductivity.

The alloy of the invention has a high degree of hardness and strength and also has a high electrical conductivity of over 45%. This is achieved by the controlled additions of the alloying elements, and the double aging heat treatment.

DESCRIPTION OF THE PREFERRED EMBODIMENT

The alloy of the invention has the following composition in weight percent:

| | |
|---|---|
| Nickel or Cobalt or mixtures thereof | 2.0–3.0% |
| Silicon | 0.4–0.8% |
| Chromium | 0.1–0.5% |
| Copper | Balance |

It is preferred that the silicon content be equal to, or preferably, slightly in excess, of the stoichiometric amount required to form the nickel and/or cobalt silicides during the first aging treatment and ensure that substantially all of the nickel and/or cobalt is removed from the solid solution as $Ni_2Si$ or $Co_2Si$, and leaving excess silicon. For example, the silicon content should be slightly in excess of the nickel content divided by 4.18. If cobalt is used in place of nickel, the silicon content should be slightly in excess of the cobalt content divided by 4.19. If the silicon content falls below the stoichiometric relationship with nickel and/or cobalt, the excess nickel and/or cobalt will remain in solution and reduce the electrical conductivity of the alloy. As it is difficult in practice to utilize precise stoichiometric amounts, it is preferred to use a slight excess of silicon over the stoichiometric relationship to insure the complete removal of nickel and/or cobalt as the silicides.

The chromium is used in an amount slightly greater than the stoichiometric amount required to form chromium silicide, $Cr_3Si$ or $Cr_5Si_2$, with the excess silicon. As chromium has a low solubility in copper, the excess chromium will be precipitated by the second aging treatment.

In practicing the invention, nickel and silicon are added to a pure copper melt in the ratio of $Ni_2Si$, or 4.18 parts of nickel to one part silicon. A small additional amount of silicon, over the 4.18 ratio, is also added. In accordance with the law of mass action, this excess silicon serves to force the removal of more nickel from solution as $Ni_2Si$ during heat treatment, than possible if less than, or only, the exact 4.18 stoichiometric amount is added.

While the excess silicon is important to assure the precipitation of the nickel, it would be very detrimental to the conductivity to retain the silicon in solution. Thus, by utilizing sufficient chromium in the melt, a means is provided to tie up the excess silicon as a chromium silicide, either $Cr_3Si$ or $Cr_5Si_2$. There is some latitude in the chromium addition, because of the low solubility of chromium in copper, with the excess chromium being precipitated from the copper matrix by a second aging treatment.

The alloy is heat treated by initially heating to a solution temperature in the range of 1600° F. to 1800° F. The alloy is held at temperature for 1 to 3 hours, to ensure a substantially solid solution of the alloying elements in the copper matrix.

Subsequently, the alloy is quenched to retain the alloying elements in solid solution.

Following this quench, the alloy is aged at a temperature in the range of 900° F. to 1100° F. and maintained at this temperature for a period of about 1 to 5 hours and preferably about 3 hours. During this aging treatment, the metal silicides precipitate as sub-microscopic particles which increases the hardness of the alloy to a value in excess of 90 Rockwell B (185 Brinell) and the electrical conductivity to a value of 35% to 40%.

The alloy is cooled to under 750° F. and then is subjected to a second aging treatment in the range of 750° F. to 900° F. and preferably at a temperature of 850° F. The alloy is maintained at the second aging temperature for a period of 1 to 5 hours, and preferably about 3 hours. During the second aging treatment, the excess chromium, over and above that required to form chromium silicides, is precipitated out of solution and the electrical conductivity of the alloy is significantly increased to a value in excess of 45%, and generally in the range of 45% to 50% with no detrimental effect on mechanical properties.

As an alternate to the two-step aging process, a controlled furnace cooling treatment can be used. In the alternate method, the alloy, after quenching from the solution temperature, is heated to an aging temperature in the range of 950° F. to 1050° F. and held at this temperature for a period of 1 to 3 hours. The alloy is then furnace cooled to a temperature in the range of 800° F. to 850° F. and held at this latter temperature for a period of about ½ to 2 hours. The alloy is then cooled to room temperature. This alternate process, in which the alloy furnace cools from the first aging temperature to the second aging temperature, is generally not as acceptable in commercial practice as the two-step aging process previously described, and must be strictly monitored because the rate of cooling depends on the relative mass of the furnace and of the product, and the nature of the furnace insulation.

The following examples illustrate the method of the invention.

EXAMPLE I

A copper base alloy having the following analysis in weight percent:

| | |
|---|---|
| Nickel | 2.62% |
| Silicon | 0.64% |
| Chromium | 0.32% |

-continued

| | |
|---|---|
| Copper | Balance | was heated to a solution temperature of 1700° F. and held at this temperature for 1 hour. The alloy was then quenched to room temperature and subsequently aged at 950° F. for three hours to precipitate the metal silicides. After the aging, the alloy had a Rockwell B hardness of 97 (222 Brinell) and an electrical conductivity of 38%.

Following the aging, the alloy was air cooled to room temperature and subjected to a second aging at 850° F. for three hours and subsequently air cooled.

The resulting alloy had a Rockwell B hardness of 97 (222 Brinell) and an electrical conductivity of 47%.

EXAMPLE III

An alloy having the following analysis:

| | |
|---|---|
| Nickel | 2.85% |
| Silicon | 0.75% |
| Chromium | 0.35% |
| Copper | Balance | was heated to a solution temperature of 1700° F. and held at this temperature for 1 hour. The alloy was then quenched in water to room temperature and subsequently heated to an aging temperature of 1050° F., held at this temperature for 1 hour, and then furnace cooled to 800° F. for a period of 1½ hours and held at this temperature for ¾ hour. The alloy was then air cooled to room temperature. After the heat treatment the alloy had a Rockwell B hardness of 95 (210 Brinell) and an electrical conductivity of 47%.

The copper base alloy of the invention, through the heat treatment, has a high degree of hardness, above 90 Rockwell B (185 Brinell), along with a high electrical conductivity of over 45%. The invention can be practiced on either cast or wrought material. The alloy has particular application in the form of resistance welding electrodes but would find general use where the combination of high mechanical properties and good conductivity would enhance performance or meet engineering design criteria.

Various modes of carrying out the invention are contemplated as being within the scope of the following claims particularly pointing out and distinctly claiming the subject matter which is regarded as the invention.

We claim:

1. A precipitation hardened copper base alloy, consisting essentially by weight of 2.0% to 3.0% of a metal selected from the group consisting of nickel, cobalt, and mixtures thereof, 0.4% to 0.8% silicon, 0.1% to 0.5% chromium, and the balance copper, said silicon being present in an amount in excess of the stoichiometric amount necessary to form silicides of said metal, and said chromium being present in excess of the stoichiometric amount required to form chromium silicide with the excess silicon not combined as said metal silicides, said alloy having a metallographic structure composed of a copper matrix containing precipitated silicides of said metal, precipitated chromium silicide and precipitated particles of elemental chromium, said matrix being substantially completely free of silicon and said metal and chromium in solid solution, said alloy having an electrical conductivity in excess of 45% of pure copper and a hardness greater than 90 Rockwell B.

2. The alloy of claim 1, wherein the metal is nickel and the silicon is present in an amount slightly in excess of the weight ratio of 1 part silicon to 4.18 parts of nickel, and said chromium is present in an amount in excess of the weight ratio of 3.18 parts of chromium to 1 part of said excess silicon.

* * * * *